United States Patent [19]

Eichberger et al.

[11] 4,404,027
[45] Sep. 13, 1983

[54] METHOD OF RECOVERING HEAVY METALS

[75] Inventors: Ernst Eichberger, Wels; Gerhard Lazar, Linz, both of Austria

[73] Assignee: Voest-Alpine Aktiengesellschaft, Linz, Austria

[21] Appl. No.: 350,439

[22] Filed: Feb. 22, 1982

[30] Foreign Application Priority Data

Mar. 5, 1981 [AT] Austria ................................. 1014/81

[51] Int. Cl.³ .............................................. C22B 15/00
[52] U.S. Cl. .......................................... 75/72; 75/25; 75/82
[58] Field of Search ................. 75/72, 82, 25; 34/209

[56] References Cited
U.S. PATENT DOCUMENTS 3,793,005 2/1974 Kelly ......................................... 75/82
3,984,232 10/1976 Bell ........................................ 75/72

FOREIGN PATENT DOCUMENTS 2017670 10/1979 United Kingdom ................... 75/25

Primary Examiner—P. D. Rosenberg
Attorney, Agent, or Firm—Brumbaugh, Graves, Donohue & Raymond

[57] ABSTRACT

In a method of recovering heavy metals from filter residues containing metal oxides, metal hydroxides or metal carbonates, the residues are dried and reduced during heat supply in the presence of carbon-containing reducing agents. The metal-containing filter residues having a water content of 30 to 80% are dried in a three-compartment rotary drier (triplex drier), wherein a product having a grain size of 0.1 to 5 mm and a packing density of 0.4 to 1.2 kg/l results, which, after the addition of the carbon-containing reducing agents, is introduced into a crucible furnace at a filling height of 0.4 to 1.5 m. It is heated to a temperature above the melting point of the metal to be recovered. The filling height is kept approximately constant during the volume reduction of the material to be reduced occurring at an increased temperature by refilling the batch.

7 Claims, 1 Drawing Figure

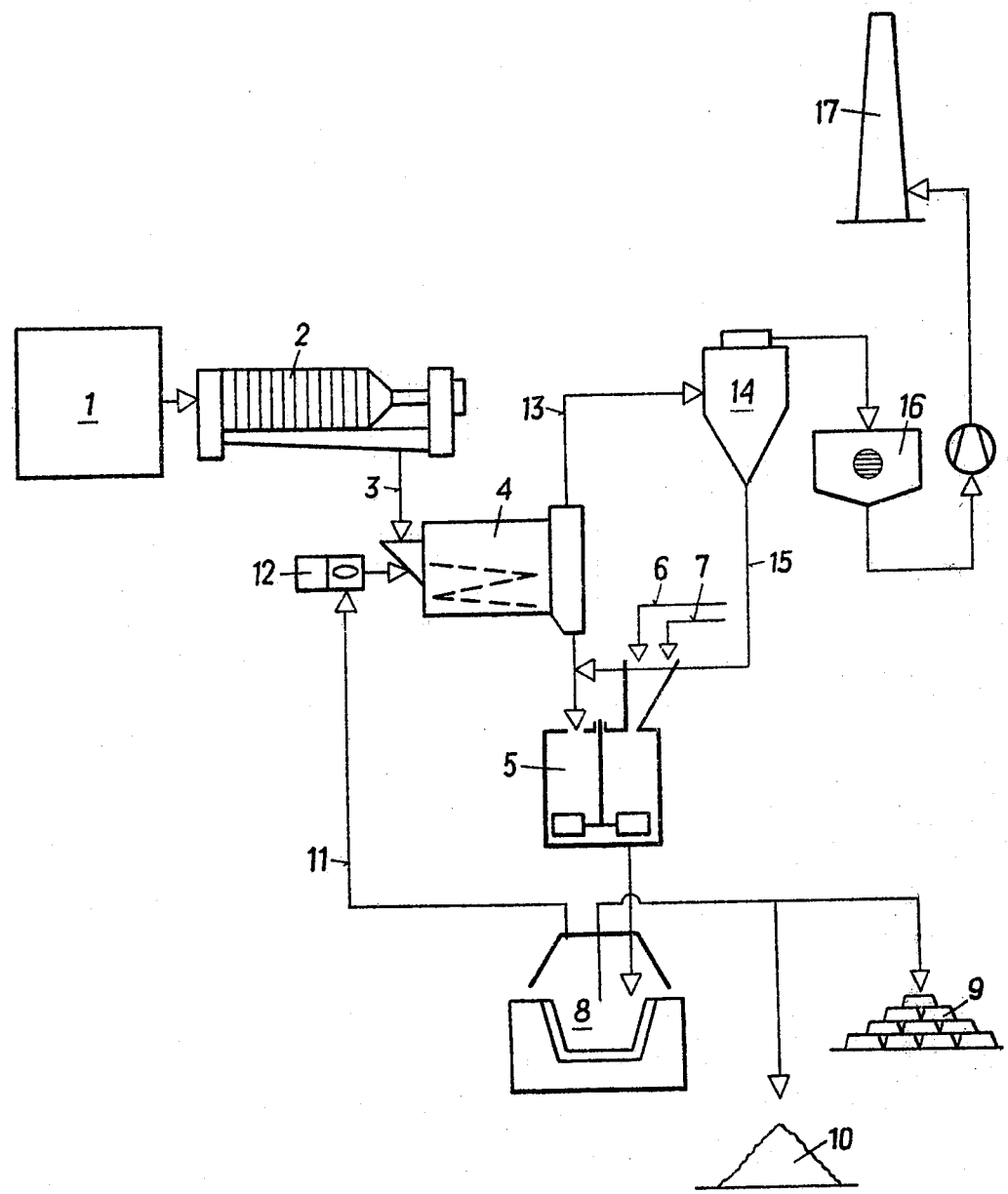

METHOD OF RECOVERING HEAVY METALS

BACKGROUND OF THE INVENTION

The invention relates to a method of recovering heavy metals, such as nickel, cobalt, copper, silver, gold, tin, zinc and chromium, from filter residues containing metal oxides, metal hydroxides or metal carbonates, in particular from sludges obtained by the treatment of galvanic waste waters with bases, wherein the residues are dried and reduced during heat supply in the presence of carbon-containing reducing agents and, if desired, upon the addition of additives.

In galavanic plants large amounts of sludge substantially containing one metal only result from galvanic waste waters on individual production sites. Thin sludge usually is obtained by the neutralization of the acid waste waters with basic compounds, such as, e.g., NaOH, Ca(OH)$_2$, CaCO$_3$, etc., and is further dehydrated to a compact sludge or filter cake by filter presses, decanters and the like. At present, these residues primarily are stored in waste dumps or are destroyed at high costs.

Metal recovering methods are already known, in which metal-oxide containing dusts together with fine-particle carbon-containing reducing agents are heated, thus being reduced in electric or drum furnaces, with CO and/or CO$_2$ being released. Disadvantages involved therein are working and environmental problems caused by dusting, losses of the metal to be recovered also being unavoidable.

It is furthermore known to pelletize or briquet such metal-containing dusts after the addition of reducing agents, the material to be reduced being guided on a flat bed through a heated rotary hearth like in German Offenlegungsschrift No. 21 34 116. With this method, the temperature is kept below the melting temperature of the material to be recovered, so that a sintered product will result which must be processed further.

SUMMARY OF THE INVENTION

The invention aims at avoiding the disadvantages and difficulties described and has as its object to reduce, by a specific selection of the method parameters, a non-dusting metal-containing pre-product at melting temperatures and to recover the metals in their pure form.

This object of the invention is achieved in that the metal-containing filter residues having a water content of 30 to 80% are dried in a three-compartment rotary drier (triplex drier), wherein a product having a grain size of 0.1 to 5 mm and a packing density of 0.4 to 1.2 kg/l results, which product, after the addition of the carbon-containing reducing agents, such as breeze, used oil or plastic wastes, is introduced into a crucible furnace at a filling height of 0.4 m to 1.5 mm and is heated to a temperature above the melting point of the metal to be recovered, the filling height being kept approximately constant during the volume reduction of the material to be reduced occurring at an increased temperature by refilling the batch.

When carrying out the method according to the invention it is of importance to use a pre-product whose grain size is in the defined region indicated, whereby nuisance by dust and losses are prevented on the one hand and which product is sufficiently free-flowing on the other hand in order to be capable of being charged and recharged directly into a crucible furnace. The desired grain size is achieved without any further measures by using a triplex drier into which the filter cake having the degree of humidity indicated is introduced.

For the composition of a substantially Ni-containing filter residue, the following two illustrative analyses are indicated:

| Filter residue No. | H$_2$O [%] | In dry substance | | | | | |
|---|---|---|---|---|---|---|---|
| | | Ni [%] | SiO$_2$ [%] | CaO [%] | FeO [%] | Cu [%] | Cr [%] |
| 1 | 76 | 41 | 9.1 | 2.7 | 2.6 | 0.07 | 0.01 |
| 2 | 72.5 | 17.5 | — | — | — | 0.09 | 0.01 |

A typical sieve analysis of the pre-product to be used in accordance with the invention is the following:
0.1 to 0.2 mm 3.5%
0.2 to 0.5 mm 9%
0.5 to 1 mm 10%
1 to 2 mm 18%
2 to 3 mm 23%
3 to 5 mm 29%

The carbon-containing reducing agents suitably are added to the pre-product in an amount corresponding to the stoichiometric ratio according to the reaction equations

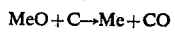

$$MeO + C \rightarrow Me + CO$$

(Me representing a

$$MeO + CO \rightarrow Me + CO_2$$

heavy metal in the oxidation degree +II).

Depending on the substances contained in the metal-containing filter residues, the addition of additives, such as fluxes, for instance SiO$_2$ or CaF$_2$, may prove suitable.

For recovering tin, plastic wastes coated with tin, in particular tin-coated printed board wastes, are preferably used as carbon-containing reducing agents.

For the purpose of an improved utilization of energy, the hot gases obtained by the afterburning of the CO- and CO$_2$-containing waste gases forming in the crucible furnace advantageously are used for drying the filter residues, the waste gases withdrawn from the drier being dedusted and purified.

When carrying out the method of the invention also the type of melting furnace is of relevance. Flat bed furnaces are as little suited as drum-type furnaces. It was found that crucible furnaces are best suited for a perfect reduction under melting conditions, in which a certain bath depth is observed and maintained. The heating of the furnaces may be effected electrically—for instance by resistance or induction heating—or by means of gas or oil burners. The crucible walls may be composed of carbon silicide, graphite, mullite, magnesium oxide, zirconium oxide, spinels, or Al$_2$O$_3$.

The reduction procedure is completed already at temperatures below the melting point of the respective metals to be recovered. In order to better utilize the heat energy supplied, the filling height of the material to be reduced is kept approximately constant by a one-time or several-time recharging. When recovering Ni, the reduction in the volume of the contents of the crucible furnace is initiated, for instance, at about 1,050° C.

The method according to the invention is illustrated in the drawing by means of a flow chart.

In a neutralization plant 1 acid, metal-containing solutions are treated with bases. The metal compounds precipitated are squeezed off in a chamber filter press 2, and the metal-containing filter residues obtained are supplied to a triplex drier 4 through a conduit 3. The emerging dried product is supplied to a mixer 5, in which it is thoroughly mixed with carbon-containing reducing agents supplied through conduit 6 as well as, if desired, with additives that may be introduced through a conduit 7. From the mixer, the mixture reaches a crucible furnace 8. When teeming the molten metal, the metal is being separated from possible present slag. The metal is, for instance, cast into bars 9, the slag 10 being dumped. The CO- and $CO_2$-containing waste gases forming in the crucible furnace are conducted through a conduit 11 to a hot gas production plant 12, where they are afterburnt. The hot gases produced are supplied to the drier 4 as the drying medium and cool off during the drying procedure such that they leave the drier at a temperature of about 200° to 300° C. These cooled gases are supplied to a dry dedusting plant 14 via a conduit 13. The dust developing in the dry dedusting plant is guided back to the mixer via a conduit 15. The pre-purified gas is supplied to a wet washer 16 from which the purified waste gas enters the open air via a chimney 17.

The invention will now be explained in more detail by the following examples.

EXAMPLE 1

0.7 kg of dried filter residue substantially containing one metal only, i.e. 41% by mass of Ni, is mixed with 0.06 kg of breeze and introduced into an induction-heated crucible furnace. After a period of about 10 minutes, the charge has reached a temperature of about 1,490° C. The contents of the crucible furnace is teemed off. 0.315 kg of metallic nickel having a purity degree of 90.5% and 0.062 kg of slag are obtained.

EXAMPLE 2

A filter residue having a water content of 64.5% and a content of 10.83% of tin is dried. 1.125 kg of the dried residue are mixed with 0.24 kg of tin-coated plastic wastes containing about 13% Sn, and with 0.135 kg of fluorspar, the mixture being filled into a crucible furnace.

0.156 kg of tin having a purity degree of 95% are obtained, which corresponds to a yield of 97% of theory.

What we claim is:

1. In a method of recovering heavy metals, including nickel, cobalt, copper, silver, gold, tin, zinc and chromium, form filter residues containing at least one of metal oxides, metal hydroxides and metal carbonates, which comprises the steps of drying said filter residues, adding carbon-containing reducing agents to said dried filter residues to produce a mixture, and reducing said mixture in a furnace, the improvement wherein:

metal-containing filter residues having a water content of 30% to 80% are dried to obtain a product having a grain size of 0.1 mm to 5 mm and a packing density of 0.4 kg/l to 1.2 kg/l, and wherein the mixture of said dried filter residues and carbon-containing reducing agents (a) is charged into a crucible furnace at a filling height of 0.4 m to 1.5 m;

(b) heated in said crucible furnace to a temperature higher than the melting point of the metal to be recovered; and (c) maintained at an approximately constant height therein by refilling said furnace with said mixture as volume reductions occur.

2. A method as set forth in claim 1, wherein said filter residues are reduced upon the addition of additives.

3. A method as set forth in claim 1, wherein said carbon-containing reducing agent is selected from the group consisting of breeze, used oil and plastic wastes.

4. A method as set forth in claim 3 for recovering tin, wherein tin-coated plastic wastes are used as said carbon-containing reducing agents.

5. A method as set forth in claim 4, wherein said tin-coated wastes are tin-coated printed board wastes.

6. A method as set forth in claim 1, wherein CO- and $CO_2$-containing waste gases forming in the crucible furnace are afterburnt so as to obtain hot gases, said hot gases being used for drying said metal-containing filter residues with waste gases forming, said waste gases being withdrawn from the drier, dedusted and purified.

7. A method as set forth in any of claims 2–1, wherein said drying step is carried our in a three-compartment rotary drier.

* * * * *

UNITED STATES PATENT AND TRADEMARK OFFICE
CERTIFICATE OF CORRECTION

PATENT NO. : 4,404,027
DATED : Sept. 13, 1983
INVENTOR(S) : Eichberger et al.

It is certified that error appears in the above—identified patent and that said Letters Patent is hereby corrected as shown below:

Col. 1, line 55, "1.5 mm" should read --1.5 m--.

Col. 2, lines 26-32,

"MeO+C $\longrightarrow$ Me+CO (Me representing a
MeO+CO $\longrightarrow$ Me+CO$_2$ heavy metal in the oxidation degree + II)." should read --MeO + C $\longrightarrow$ Me + CO    (Me representing a
  MeO + CO $\longrightarrow$ Me + CO$_2$    heavy metal in the
                          oxidation degree + II).--.

Col. 4, line 7, "form" should read --from--; line 43, "claims 2-1" should read --claims 1-6--.

Signed and Sealed this

Twelfth Day of March 1985

[SEAL]

Attest:

DONALD J. QUIGG

Attesting Officer    Acting Commissioner of Patents and Trademarks